United States Patent [19]
Zettle

[11] Patent Number: 5,900,293
[45] Date of Patent: May 4, 1999

[54] COLLAPSIBLE, MONOLAYER MICROWAVEABLE CONTAINER

[75] Inventor: Jeffrey J. Zettle, Bay City, Mich.

[73] Assignee: S. C. Johnson Home Storage Inc., Racine, Wis.

[21] Appl. No.: 08/780,112

[22] Filed: Dec. 26, 1996

[51] Int. Cl.[6] ............................ A45B 19/00; B29D 22/00; B65D 6/08
[52] U.S. Cl. ...................... 428/12; 428/35.7; 428/36.92; 220/666
[58] Field of Search .................................. 428/35.7, 36.9, 428/36.92, 12, 156, 220; 220/4.05, 4.31, 8, 666; 215/382, 900; 222/92; 206/218; 221/65

[56] References Cited

U.S. PATENT DOCUMENTS

| | | |
|---|---|---|
| 4,930,644 | 6/1990 | Robbins, III ................................ 215/1 |
| 5,098,634 | 3/1992 | Robbins, III ............................. 264/536 |
| 5,219,628 | 6/1993 | Hathaway et al. ...................... 428/36.9 |
| 5,226,551 | 7/1993 | Robbin, III .................................. 220/8 |
| 5,392,941 | 2/1995 | Robbins, III ................................ 220/8 |
| 5,417,337 | 5/1995 | Robbins, III ................................ 220/8 |

FOREIGN PATENT DOCUMENTS

WO 95/24347  9/1995  WIPO .

Primary Examiner—Ellis Robinson
Assistant Examiner—Jennifer M. Hayes

[57] ABSTRACT

A collapsible container having a generally cylindrical configuration including at least an upper thicker section and a lower thicker section, and at least one thinner section positioned between the upper and lower thicker sections. When the container is collapsed, the upper and lower thicker sections are telescoped within one another and the thinner section is folded therebetween. The container is made of a monolayer of a thermoplastic polymer having a flex modulus of from 60,000 to 160,000 psi and a heat distortion temperature at 66 psi of greater than 170 degrees F. A process for making the collapsible container using extrusion blow molding is also disclosed.

6 Claims, 2 Drawing Sheets

COLLAPSIBLE, MONOLAYER MICROWAVEABLE CONTAINER

BACKGROUND OF THE INVENTION

Many reusable thermoplastic containers of various sizes and shapes are known in the art which are used for packaging and storing a variety of foods or non-food items. Such containers are useful when storing foods which are to be used up over a period of time because the food is easily resealed in the container with the use of a removable lid or cover.

Reusable, collapsible, adjustable containers are also known which are capable of being collapsed in order to save storage space. For example, a collapsible plastic container is disclosed in U.S. Pat. No. 4,930,644 to Robbins, III where a portion of the container side wall has a reduced wall thickness to permit collapse of the side wall upon the exertion of a compressive force. U.S. Pat. No. 5,226,551 to Robbins, III also relates to reusable, collapsible containers having a peripheral side wall which may be repeatedly moved between collapsed and extended positions.

Such collapsible containers are advantageous because they are reusable and may be partially collapsed as foodstuffs are consumed to save space. In addition, such containers may be compactly stored in a collapsed position, thus maximizing storage space. However, while such collapsible containers provide a convenient storage method, the containers are not necessarily suitable for heating foods in a microwave oven as the containers are usually constructed from a polymer which is not sufficiently heat resistant to maintain the structural integrity of the containers under microwave reheating or cooking conditions. In general, containers made from thermoplastic polymers or copolymers with a softening temperature below 100° C. are not sufficiently resistant to hot foods when heated in a microwave oven, and are subject to softening, which can lead to deformation and leaking.

On the other hand, if the polymer is too rigid, the polymer is not suitable for use in a collapsible container due to the high force required to open the container. Pin holes may also occur in the thinner sections of the container if the polymer is too rigid. For example, U.S. Pat. No. 5,219,628 discloses a multi-layer container suitable for use in microwave cooking comprising a substrate layer of a thermoplastic polymer and an inner protective layer comprising a blend of polymers which contacts the food. However, the polymers comprising the container structure are relatively rigid and are not suitable for use in a collapsible container.

Further, when heated, such as in a microwave oven, many thermoplastic containers are subject to staining by foods, which is undesirable for a reusable container. Another disadvantage of such containers is that they have low optical clarity, making it difficult for a consumer to see the food or liquid stored inside the container.

Accordingly, the need still exists in this art for a thermoplastic container which is flexible enough to be collapsed for compact storage of food or non-food items, rigid enough to withstand microwave heating, and which maintains optical clarity.

SUMMARY OF THE INVENTION

The present invention provides for such a container. The present invention is a container which includes an upper open end, a lower end closed by a bottom wall, and a peripheral side wall extending between the upper and lower ends. The peripheral side wall has a plurality of thicker sections, including at least an upper thicker section and a lower thicker section. The peripheral sidewall also has at least one thinner section positioned between the upper and lower thicker sections. The peripheral sidewall is adapted to move between an extended position and a collapsed position such that when the peripheral sidewall is in the collapsed position, the upper and lower thicker sections of the peripheral sidewall are telescoped within one another and the thinner section is folded therebetween. The peripheral side wall and bottom wall comprise a monolayer of a thermoplastic polymer having a flex modulus of from 60,000 to 160,000 psi and a heat distortion temperature at 66 psi of greater than 170 degrees F.

In another aspect, the present invention is a process for making a collapsible container comprising: a) extruding a monolayer of a thermoplastic polymer in an extruder to form a parison, the extruder having a die gap which is adjusted so that the parison has at least an upper thicker section and a lower thicker section and at least one thinner section positioned between the thicker sections, the thermoplastic polymer having a flex modulus of from 60,000 psi to 160,000 psi and a heat distortion temperature at 66 psi of greater than 170 degrees F.; b) closing a pair of mold halves around the parison to form a mold; c) blowing the parison into engagement with the interior surfaces of the mold; and d) opening the mold halves to release the container.

DETAILED DESCRIPTION OF THE PREFERRED EMBODIMENTS

The present invention includes containers made from a monolayer of a polymer with particular properties, providing both the flexibility needed for collapsing and the heat resistance/rigidity required for microwavability.

The containers may also be used in the freezer or refrigerator. In addition, the containers have good drop impact resistance at room temperature.

Figure 1:
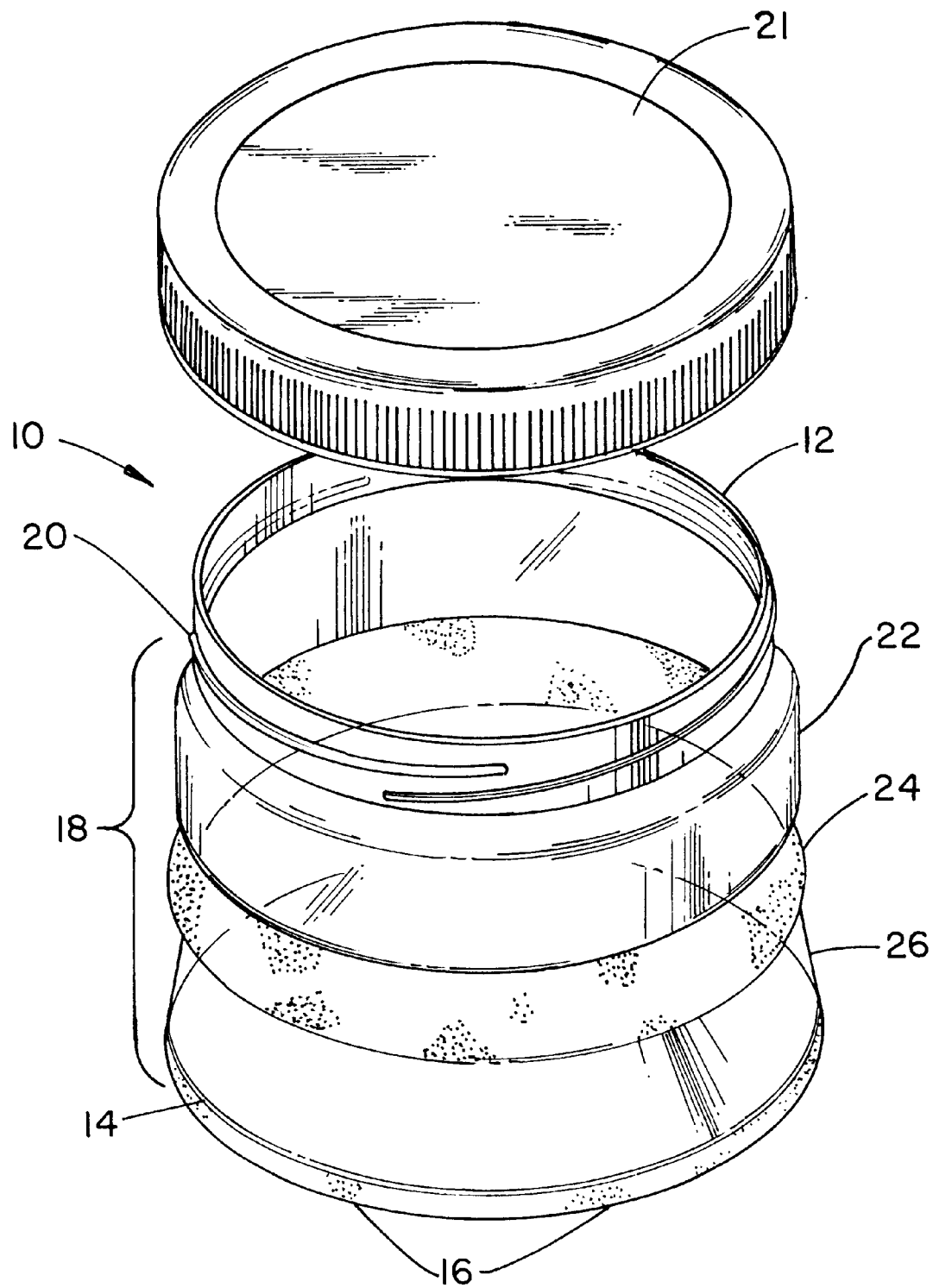
FIG. 1 is a perspective view of a collapsible container of the present invention.

Referring now to FIG. 1, a collapsible, microwavable container 10 is illustrated. The container 10 includes an upper open end 12, a lower end 14 closed by a bottom wall 16, and a peripheral side wall 18 extending between the upper and lower ends. The peripheral sidewall is shown in the extended position in FIG. 1, and includes a plurality of thicker portions, including an upper thicker portion 22 and a lower thicker portion 26. The peripheral sidewall 18 also includes a thinner portion 24 positioned between the upper and lower thicker portions 22 and 26.

The peripheral sidewalls of the container consist of a monolayer of a thermoplastic polymer having a flex modulus of at least about 60,000 psi (414 mPa), preferably at least about 80,000 psi (552 mPa), and more preferably at least about 100,000 psi (689 mPa). The flex modulus of the thermoplastic polymer is up to about 160,000 psi (1,103 mPa), preferably up to about 140,000 psi (965 mPa), and more preferably up to about 120,000 psi (827 mPa)(as measured by ASTM method D790 B). The flex modulus is an important indication of the flexibility required for collapsing the container.

Preferably, the polymer used to make the monolayer microwaveable container also has other particular properties which fall within specific ranges, including Vicat softening point, heat distortion temperature and haze value or clarity. Preferably, the polymer has a Vicat softening point of greater than 220 degrees F. (104 degrees C.), more preferably greater than 240 degrees F. (115 degrees C.), and even more preferably greater than 270 degrees F. (132 degrees C.).

The polymer has a heat distortion temperature at 66 psi load of greater than 170 degrees F. (77 degrees C.), preferably greater than 185 degrees F. (85 degrees C.), and more preferably greater than about 200 degrees F. (93 degrees C.). The heat distortion temperature is an indication of the microwavability of the container, which means that the container does not melt or soften appreciably when it is heated in the microwave.

The polymer preferably has a haze value of less than 50% for a 45 mil sample, more preferably less than 45%, and even more preferably less than 40%. Haze value is an indication of the clarity of the container. The container advantageously has sufficient clarity such that food inside the container can be seen. The haze value can be measured by the Digital Photometric Method (ASTM D-1003) using a Gardner Model TG5500 photometer.

Preferably, the thermoplastic polymer used to make the container of the present invention comprises a copolymer of polypropylene. The flex modulus for copolymers of polypropylene is a function of the crystal structure, which is affected by the amount of co-monomer, such as ethylene, in the resin. Preferably, the ethylene co-monomer in the resin is greater than about 2.1 weight percent, more preferably greater than about 2.3 percent, even more preferably greater than about 2.5 percent, and most preferably greater than about 2.6 percent. Preferably, the ethylene comonomer in the resin is less than about 3.2 weight percent, more preferably less than about 3.0 percent, even more preferably less than about 2.9 percent, and most preferably less than about 2.8 percent. Polypropylene copolymers with less ethylene will tend to be too stiff, whereas polypropylene copolymers with more ethylene comonomer will be too flimsy and have lower heat distortion temperatures. Examples of copolymers of polypropylene having the desired properties include Exxon 9122, Rexene 23B2Acs226, Fina 7231X, Fina 7231XZ, and Solvay 4141.

The thermoplastic polymer should be chosen to have the desired properties so that the container has both good collapsibility and microwavability. Collapsibility is determined by the amount of force required to extend or collapse the container. Preferably, the opening force, i.e., the force required to move the container from a collapsed position to an extended position, is less than about 15 pounds on the third opening of the container. More preferably, the opening force is less than about 12 pounds, even more preferably less than about 10 pounds, and most preferably less than about 8 pounds. Preferably, the closing force, i.e., the force required to move the container from an extended position to a collapsed position, is less than about 12 pounds. More preferably, the closing force is less than about 10 pounds, even more preferably less than about 8 pounds and most preferably less than about 5 pounds. The opening and closing forces can be measured using, for example, an Instron (trademark) testing device commonly used in polymer testing labs. The measurements are taken on the third opening or closing of the container. The limits expressed herein are the peak forces demonstrated by the Instron testing device.

The container is preferably formed so as to provide a generally cylindrical shape from top to bottom, although the container can also be square, octagonal, or any other desired shape. Different shapes may have different variations in wall thicknesses in any given section of the container, however, due to the molding process. For example, round cylindrical containers will have a substantially uniform wall thickness, whereas square containers may have a wider variation in thickness across the wall, due to non-symmetrical geometries which result in different parison stretch distances. Generally, square containers and containers having other polygonal shapes may be thicker along the straight wall edges and will be thinner at the wall corners. Thus, wall thickness can be expressed as an average thickness.

The thickness of the thicker sections 22 and 26 is preferably greater than about 0.030 inches (0.076 cm) on average, and more preferably greater than about 0.040 inches (0.10 cm) on average. Preferably, the thickness of the thicker sections 22 and 26 are less than about 0.070 inches (0.17 cm) on average, more preferably less than about 0.060 (0.15 cm) inches on average, and even more preferably less than about 0.050 inches (0.13 cm) on average.

The thickness of the thinner section 24 is preferably greater than about 0.005 inches (0.013 cm) on average, more preferably greater than about 0.006 inches (0.015 cm) on average, and even more preferably greater than about 0.007 inches (0.018 cm) on average. Preferably, the thinner section 24 has a thickness less than about 0.013 inches (0.033 cm) on average, more preferably less than about 0.011 inches (0.028 cm) on average, and even more preferably less than about 0.009 inches (0.023 cm) on average. The appropriate thickness of the thinner section 24 permits collapse of the container by the folding of the thinner section.

The container may be configured to collapse at different points of the sidewall by varying the wall thickness at selected points. However, the sidewall portions should be configured so that when the container is collapsed, minimal spacing exists between the collapsed walls which could entrap the contents of the container.

The container has a closed bottom and an open upper end as shown in FIG. 1. The open end should be wide enough to allow access to and cleaning of the interior of the container.

Figure 2:
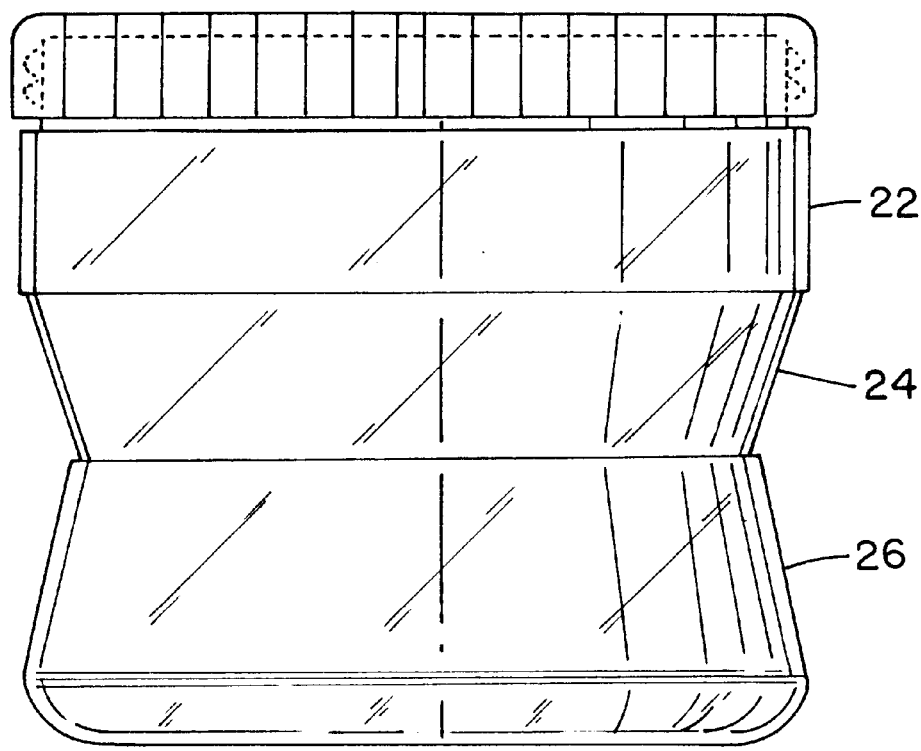
FIG. 2 is a side view of the container shown in FIG. 1.
Figure 3:
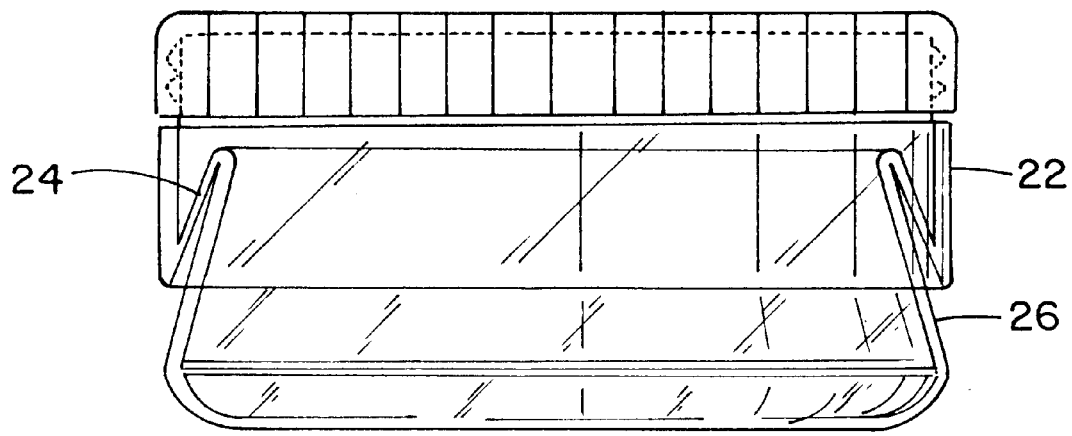
FIG. 3 is a side view of the container of FIG. 2 shown in a collapsed position.

FIG. 2 illustrates an embodiment of the invention which is a round cylindrical container in which the upper thicker section 22 is vertical, the thinner section 24 is angled inward, and the lower thicker section 26 is angled outward. The upper thicker section has a thickness of about 0.045 inches (0.13 cm) on average, the thinner section has an average thickness of about 0.007 inches (0.018 cm), and the lower thicker section has an average thickness of about 0.045 inches (0.13 cm). In the collapsed position shown in FIG. 3, the thinner section 24 is folded down such that the lower thicker section 26 is telescoped within the upper thicker section 22.

The monolayer container of the present invention can be produced by extruding the polymer followed by a conventional blow-molding process, although other molding methods may be employed. Generally, an extrusion blow molding process involves first extruding the monolayer of thermoplastic polymer through a die to form a tubular parison. As the parison is being extruded, the die gap of the extruder is adjusted so that the resulting parison has a plurality of thicker sections and at least one thinner section between the thicker sections. The die gap can be adjusted using conventional techniques commonly known as "parison programming". Once the parison is formed, a pair of mold halves, which together form the desired container shape, are closed around the parison. Air is then blown into the inside of the parison so that the outer surface of the parison is blown into engagement with the interior surfaces of the mold. Finally, the mold halves are separated, and the collapsible container of the present invention results.

The polypropylene fed to the extruder can be either in virgin or reground trim scrap form. The scrap polypropylene can be in flake or pelletized form.

The configuration of the container can vary. For example, as shown in FIG. 1, the upper thicker section can be vertical, the thinner section can be angled inward and the lower thicker section can be angled outward. Alternatively, the upper thicker section can be angled inward as well as vertical. The thinner section can be vertical, angled inward or angled outward. The lower thicker section can be vertical, angled inward or angled outward.

Also as shown in FIG. 1, the container preferably includes a threaded portion 20 for receiving a screw-on closure 21. However, it should be appreciated that other conventional caps or lids may be employed in the present invention.

It should also be appreciated that the size of the container may vary. For example, the container size can be anywhere from a 2-cup to a 16-cup container, or even bigger, if desired.

Other variations of the container structure are within the scope of the invention. For example, the lower sidewall of the container may include a textured or roughened surface to enable a user to grip the container during collapse and extension of the container.

To aid in the collapsing and opening of the container, the polymers may contain a slip additive. Preferably, the slip additive concentration is greater than about 200 parts per million (ppm), more preferably greater than about 500 ppm, and even more preferably greater than 800 ppm. Preferably, the slip additive concentration is less than about 3000 ppm, more preferably less than about 2500 ppm, and even more preferably less than about 2000 ppm. Furthermore, the polymers may contain an antiblocking agent, if desired.

In order that the invention may be more readily understood, reference is made to the following examples, which are intended to be illustrative of the invention, but are not intended to be limiting in scope.

EXAMPLES 1 and 2

For both Examples 1 and 2, collapsible monolayer containers having a shape shown in FIG. 1 are produced in accordance with the present invention using Bekum blow molding equipment. The volume of each container is about 3.5 cups. The overall height of each container is 4.5 inches in the extended position and 2.5 inches in the collapsed position. The overall diameter is 4.5 inches.

The containers are made out of different resins which are random copolymers of polypropylene having ethylene as a comonomer. The upper thicker portion of each container is 0.045 inches thick (0.1143 cm) on average. The thinner portion is 0.008 inches thick (0.02032 cm) on average. The lower thicker portion is 0.045 inches thick (0.1143 cm) on average.

Each container is tested for the resulting properties, as listed below in Table I. Each container is also tested to determine acceptable resistance to microwave cooking according to the following test. Approximately 12 oz. of a commercially prepared can of chili is placed into the container. The container is then heated, uncovered, in a microwave oven under full power (750 watts) for about 3 minutes. After each minute of heating, the food is stirred thoroughly.

The container is inspected for deformation and staining after 3 minutes. Each container is found to have minimal staining and to be resistant to deformation. No leaks are noted.

TABLE I

|  | Example 1 | Example 2 |
| --- | --- | --- |
| Type of Resin | Solvay 4141 | Fina 7231X |
| % Ethylene comonomer | 2.7 | 2.7 |
| Flex Modulus (psi) | 110,000 | 120,000 |
| Heat Distortion Temp. @ 66 psi (°F.) | 185 | 180 |
| Haze (%) | 42 | 42 |
| Opening Force (lbs) | 8.0 | 8.0 |
| Microwavability | Good | Good |

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A collapsible, microwaveable container comprising an upper open end, a lower end closed by a bottom wall, and a peripheral side wall extending between the upper and lower ends, the peripheral side wall having a plurality of thicker sections, including at least an upper thicker section and a lower thicker section, the peripheral sidewall also having at least one thinner section positioned between the upper and lower thicker sections, the peripheral sidewall being adapted to move between an extended position and a collapsed position such that when the peripheral side wall is in the collapsed position, the upper and lower thicker sections of the peripheral sidewall are telescoped within one another and the thinner section is folded therebetween, the entirety of the peripheral side wall being constructed of a monolayer of the same thermoplastic polymer, said polymer being a co-polymer of polypropylene containing an ethylene co-monomer of between 2.1 and 3.2 weight percent, which has the same flex modulus, which is in the range of from 60,000 to 160,000 psi, and which has a heat distortion temperature at 66 psi of greater than 170 degrees F.

2. The container of claim 1 wherein the thermoplastic polymer has a flex modulus of from 80,000 to 140,000 psi.

3. The container of claim 2 wherein the thermoplastic polymer has a heat distortion temperature at 66 psi of greater than 185 degrees F.

4. The container of claim 3 wherein the thermoplastic polymer has a flex modulus of from 100,000 to 120,000 psi.

5. The container of claim 4 wherein the thermoplastic polymer has a heat distortion temperature of greater than 200 degrees F.

6. A thermoplastic container which is flexible enough to be collapsed for compact storage, rigid enough to withstand microwave heating and which maintains optical clarity, said container comprising:

a bowl having an upper open end, a lower end closed by a bottom wall, a peripheral side wall extending between the upper and lower ends, the peripheral side wall having an upper section, a middle section and a lower section, the middle section being thinner than the upper and lower sections to permit the side wall to move between an extended position and a collapsed position where the upper and lower sections are telescoped within one another and the middle section is folded therebetween, the entirety of the bowl being constructed of a monolayer of the same thermoplastic polymer having the same flex modulus, said thermoplastic polymer being a co-polymer of polypropylene containing an ethylene co-monomer of between 2.1 and 3.2 weight percent, said polypropylene co-polymer having a flex modulus of at least about 100,000 psi and up to about 120,000 psi, and said polypropylene co-polymer having a heat distortion temperature at 66 psi of greater than 170° F.

* * * * *